United States Patent [19]
Wissel et al.

[11] 4,281,412
[45] Jul. 28, 1981

[54] METHOD OF AND APPARATUS FOR TRANSMITTING AND RECOVERING OFFSET QPSK MODULATED DATA

[75] Inventors: Frank A. Wissel, Cincinnati, Ohio; Donald E. Smith, Melbourne, Fla.; Robert L. Martinet, Roanoke, Va.; Mark J. Dapper; Douglas A. Kiliman, both of Cincinnati, Ohio

[73] Assignee: Cincinnati Electronics Corporation, Cincinnati, Ohio

[21] Appl. No.: 54,902

[22] Filed: Jul. 5, 1979

[51] Int. Cl.$^3$ .................... H03D 3/22; H04L 27/22
[52] U.S. Cl. .................................. 375/86; 375/120; 329/112
[58] Field of Search ............... 328/133; 329/122, 124, 329/104, 112; 370/12, 20; 371/46; 375/54, 57, 39, 81, 86, 120

[56] References Cited

U.S. PATENT DOCUMENTS

| | | | |
|---|---|---|---|
| 3,401,339 | 9/1968 | Kluever et al. | 375/87 |
| 3,562,710 | 2/1971 | Halleck | 371/57 |
| 3,626,298 | 12/1971 | Paine | 375/120 |
| 3,815,034 | 6/1974 | Kato | 375/86 |
| 4,023,103 | 5/1977 | Malm | 375/1 |
| 4,076,956 | 2/1978 | Dogliotti et al. | 375/86 |
| 4,092,606 | 5/1978 | Lovelace | 375/54 |

*Primary Examiner*—Benedict V. Safourek
*Attorney, Agent, or Firm*—Lowe, King, Price & Becker

[57] ABSTRACT

Bit timing references are derived at a receiver for a carrier modulated by OQPSK. A carrier is transmitted with a constant reference phase modulation during a first interval. During a subsequent, second interval the carrier is transmitted with rotational phase modulation representing binary bit values so that orthogonal components phase modulate the carrier with a predetermined bit sequence. A receiver responds to the constant phase modulated carrier to lock the frequency and phase of a phase lock loop oscillator of a carrier recovery loop. Synchronization at the receiver is achieved in response to a reception of the rotational phase modulation, while maintaining the frequency and phase lock. A carrier recovery loop of the receiver is activated to a decision directed operation after bit synchronization has been achieved. Decision directed operation is achieved by sampling and comparing components derived in orthogonal channels of the carrier recovery loop while the receiver is responsive to the rotational phase modulation. The bandwidth of a filter used in achieving bit synchronization is reduced after there has been a decay of transients in the carrier tracking loop resulting from a transition between locking of the loop and initiation of the decision directed operation. Then the bandwidth of a filter in the carrier tracking loop is adjusted as a function of the quality of the received rotational modulated suppressed carrier.

32 Claims, 12 Drawing Figures

METHOD OF AND APPARATUS FOR TRANSMITTING AND RECOVERING OFFSET QPSK MODULATED DATA

TECHNICAL FIELD

The present invention relates generally to a system for and method of transmission and reception of digital data modulated on a carrier by offset quadrature phase shift keying (OQPSK). The invention is particularly related to a preamble part of a message structure and methods for achieving receiver carrier and bit timing references to perform demodulation and data recovery.

BACKGROUND ART

The OQPSK modulation method has the desirable attributes of providing a constant amplitude envelope at a narrower frequency spectrum than the more conventional, non-offset QPSK. These desirable attributes enable an OQPSK transmitter to drive a simple, high efficient carrier amplifier and derive a suppressed carrier wave having minimal interference from transmissions of other nearby radio frequency channels. A coherent demodulator is, however, required and must determine and acquire the frequency and phase (within four-fold ambiguity limitations) of the missing, i.e., suppressed, carrier and achieve data bit frequency and phase synchronization. Often it is required to perform these tasks in a minimum time period, under conditions of high bit error rate (BER) or poor signal-to-noise ratio (SNR), with relatively large frequency uncertainties. These three requirements are in conflict, however.

The typical receiver approach to carrier "recovery" and bit synchronization involves the use of first and second servo loops respectively called a carrier tracking loop (CTL) and a bit synchronizer loop. Both loops are often designed as phase locked loops (PLL's). For high bit error rate (BER) performance, it is necessary to generate phase-stable carrier and bit references even under conditions of poor BER. Therefore, both loops are required to have relatively narrow bandwidths, a factor that limits (1) the amount of frequency uncertainty that can be accommodated without frequency search and (2) the acquisition rate, with or without frequency search.

The present invention therefore addresses (1) preamble signal structure, (2) the receiver loops and (3) an acquisition method and apparatus for reliable and fast signal acquisition under the above conditions for OQPSK modulated signals.

There is a problem associated with all CTL circuitry for suppressed carrier demodulation where the carrier frequency uncertainty is a significant fraction of the bit rate. The problem involves the possibility of the loop temporarily locking or attempting to lock onto modulation sidebands, instead of the proper carrier frequency. A more serious problem can exist when the OQPSK modulation form is equivalent to minimum shift keying (MS) as discussed in the copending, commonly assigned application "QPSK Suppressed Carrier With Rotating Reference Phase", Ser. No. 30,905, filed Apr. 17, 1979. In this equivalent situation with half-cosine shaping of the envelope in each of the quadrature signal components, it has been found that for the duration of a certain short-term data pattern, steady single-frequency sideband transmission can result. This sideband frequency can be offset in either direction from the carrier frequency, with the offset value being one-fourth the bit rate frequency.

A final problem involves the nature of an optimum-performing decision-directed control tracking loop (DDCTL). The DDCTL integrates information during a data bit interval and makes a polarity decision before applying the result as a correction signal to a voltage controlled reference oscillator of the DDCTL. Thus, in the ideal at least, bit synchronization is required before the CTL can function properly, but bit synchronization is not normally possible until the CTL is locked. This dichotomy suggests and, almost makes mandatory, the often-used concept of a special message preamble enabling the orderly acquisition and operation of the CTL and bit synchronizer before the message proper is transmitted.

DISCLOSURE OF THE INVENTION

The present invention concerns itself with four basic elements of OQPSK transmission; namely, apparatus for and method of generating the preamble potion in the modulator transmitter; the carrier tracking loop (CTL), along with the frequency search and acquisition recognition circuitry, in the receiver-demodulator; the bit synchronizer loop, along with the acquisition recognition circuitry of the receiver-demodulator; and finally the interaction and timing of the mode switching of the receiver CTL and bit synchronization circuitry.

In accordance with the particular method and apparatus of the invention, bit timing references at a receiver for a carrier modulated by OQPSK is attained by transmitting the carrier with a constant reference phase modulation during a first interval. Then, during a second interval, the carrier is transmitted with rotational phase modulation representing predetermined binary bit values. The modulation is achieved with a pair of orthogonal components modulating the carrier. In the preferred embodiment, the predetermined bit sequence causes the orthogonal modulating components to be half sinusoids of only one polarity, resembling a full wave rectified sinusoid and the reference phase is equally displaced from orthogonal modulating channels of the transmitter at a 45 degree angle.

At the receiver, the frequency and phase of a variable frequency oscillator of a carrier recovery loop is locked in response to reception of the carrier with constant phase modulation. The loop includes orthogonal processing channels and a loop filter driven by outputs of the orthogonal processing channels, which are in turn responsive to the oscillator. After lock has been achieved, bit synchronization occurs at the receiver by responding to the carrier with rotational phase modulation, so that timing signals at the receiver are synchronized with the bits modulating the carrier.

During bit synchronization, the frequency and phase lock are maintained. The carrier recovery loop is activated to decision directed operation after achieving bit synchronization. The decision directed operation is achieved by sampling and comparing components derived in the orthogonal channels while the carrier with rotational phase modulation is being received. The bandwidth of a filter used in achieving bit synchronization is reduced after the decay of transients in the carrier tracking loop resulting from a transition between locking of a loop and initiation of the decision directed operation. The bandwidth of the carrier tracking loop is then subjected as a function of the quality of the received rotational modulated suppressed carrier.

In a preferred embodiment, the quality of the received signal is indicated by bit error rate (BER). Preferably, the bit error rate is determined by comparing the average and instantaneous values of the absolute value of the signal in at least one orthogonal processing channel. The carrier tracking loop band width is increased if the instantaneous value exceeds the average value over a predetermined interval more than a predetermined number of times.

Bit synchronization is preferably achieved by integrating components of at least one, and preferably both, orthogonal processing channels over differing periods of the same bit value. The integrated components in each processing channel have approximately the same value when bit synchronization is achieved. In response to a comparison of the integrated components of both channels, the phase of a clock source that controls the carrier control loop during decision directed operation and the intervals involved in bit synchronization is controlled. Preferably, one of the integrations is performed over an interval extending from a first zero value of the processing channel half sinusoids to a time $T_A$, where $T_A$ is less than $T_B$, the period of the half sinusoid. Another of the integrations if performed over an interval extending from time $(T_B - T_A)$ to the next zero value of the processing channel half sinusoids. These integrating periods exist when bit synchronization has been achieved.

As indication that bit synchronization has been achieved is derived by integrating components of one of the orthogonal channels over differing periods of a bit value. The integrated components are compared to provide the bit synchronization indication. One of the integrations involved in bit synchronization is performed over an interval extending between a first zero value of the processing channel half sinusoids and a time $T_C$, where $T_C$ is less than $T_B/2$. Another of the integrations is performed over an interval extending from time $(T_B/2 - T_D)$ to time $(T_B/2 + T_D)$. Times $T_B$, $T_C$ and $T_D$ are such that the integration periods do not overlap.

The decision directed operation is achieved for the second interval while the carrier is modulated with the predetermined bit sequence by determining the amplitude of proportional components in each of the orthogonal processing channels. The proportional components are combined and supplied to the tracking loop filter. In contrast, while the carrier is modulated by OQSPK data subsequent to the second interval, decision directed operation for the carrier tracking loop is achieved by determining the amplitude of quadrature components in each of the orthogonal processing channels. The polarities of the proportional components supplied to the loop filter are controlled in response to the polarity of the quadrature components.

It is, accordingly, an object of the present invention to provide a new and improved method of and apparatus for transmitting and recovering OQPSK modulated data.

Another object of the invention is to provide a new and improved method of and apparatus for achieving carrier and bit timing reference in a receiver responsive to a carrier modulated by OQPSK data.

A further object of the invention is to provide an OQPSK transmission method and apparatus having improved preamble signal structure to enable orderly acquisition and operation of a controlled tracking loop and bit synchronizer of the OQPSK receiver.

An additional object of the invention is to provide an improved acquisition method and apparatus for reliable and fast signal acquisition of OQPSK modulated signals even though there is frequency uncertainty and relatively poor signal quality, as indicated by bit error rate or signal to noise ratio.

Still another object of the invention is to provide a new and improved method of and apparatus for minimizing the acquisition time period, under conditions of poor signal quality and large frequency uncertainty, in an OQPSK transmission link.

A further object of the invention is to provide a new and improved method of and apparatus for establishing an OPQSK modulated data transmission link wherein a receiver responsive to the data includes phase locked carrier tracking and bit synchronizer loops having relatively narrow bandwidths.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWINGS

Figure 1:
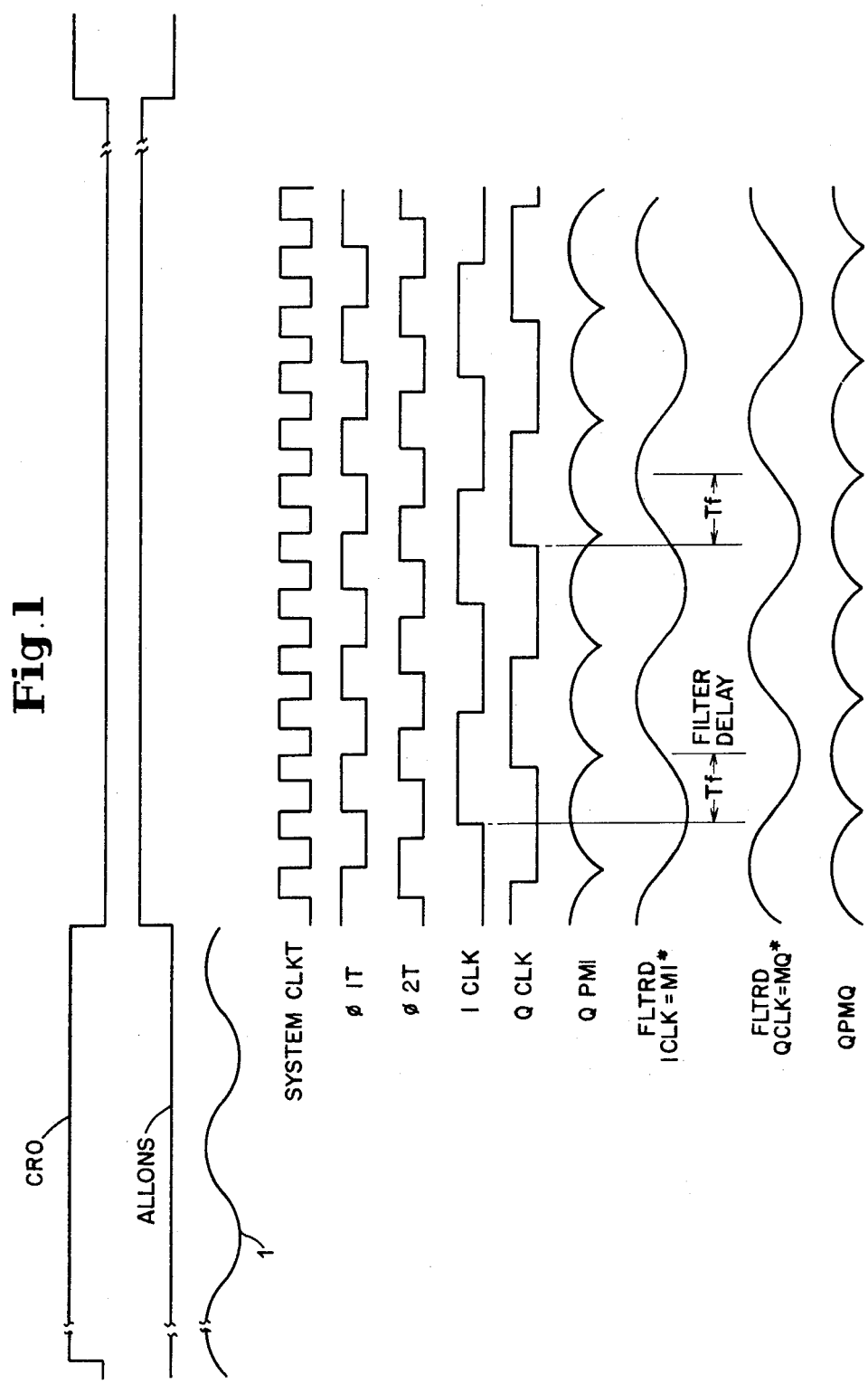
FIG. 1 is a series of wave forms derived in a transmitter in accordance with a preferred embodiment of the invention.

Reference is now made to FIG. 1 of the drawing wherein there are illustrated wave forms of a preamble of a format used in the preferred embodiment of the present invention. The preamble format is designed to enable the receiver controlled tracking loop (CTL) to be locked and bit synchronizer acquisition to be obtained in sequence. To these ends, the preamble includes a first segment from $T_0$ to $T_1$ and a second segment from $T_1$ to $T_2$. During the first segment, a steady state carrier frequency is transmitted at a phase corresponding to +45 degrees, as illustrated by wave form 1. A normal, in-phase signal component (I) is considered to be at a reference phase of 0 degrees, while a quadrature signal component (Q) is at a phase of +90 degrees. The 45 degree shifted carrier is transmitted for a period at least long enough for the CTL at the receiver to acquire the carrier frequency and phase lock onto it.

During the second segment of the preamble, between $T_1$ and $T_2$, a symbol pattern of alternate I and Q transmissions is derived with no $\bar{I}$ or $\bar{Q}$ elements. A $\bar{I}$ symbol represents a 180 degree phase relative to the 0 degree reference phase, while a $\bar{Q}$ symbol represents a −90 degree relative phase. The alternate I and Q pattern produces an alternation around the mean phase of +45 degrees which was transmitted during the first segment. The alternating transmission minimizes disturbance of the CTL at the receiver and produces consistent bit transition information to enable the receiver bit synchronizer to acquire the modulation. Once the receiver bit synchronizer has acquired the modulation, the receiver CTL circuitry is switched to a decision directed mode and the CTL and bit synchronizer loop band widths are adjusted to final values. The second, i.e., last, preamble segment, has a sufficient duration to insure that both loop band widths have been so adjusted.

Figure 2:
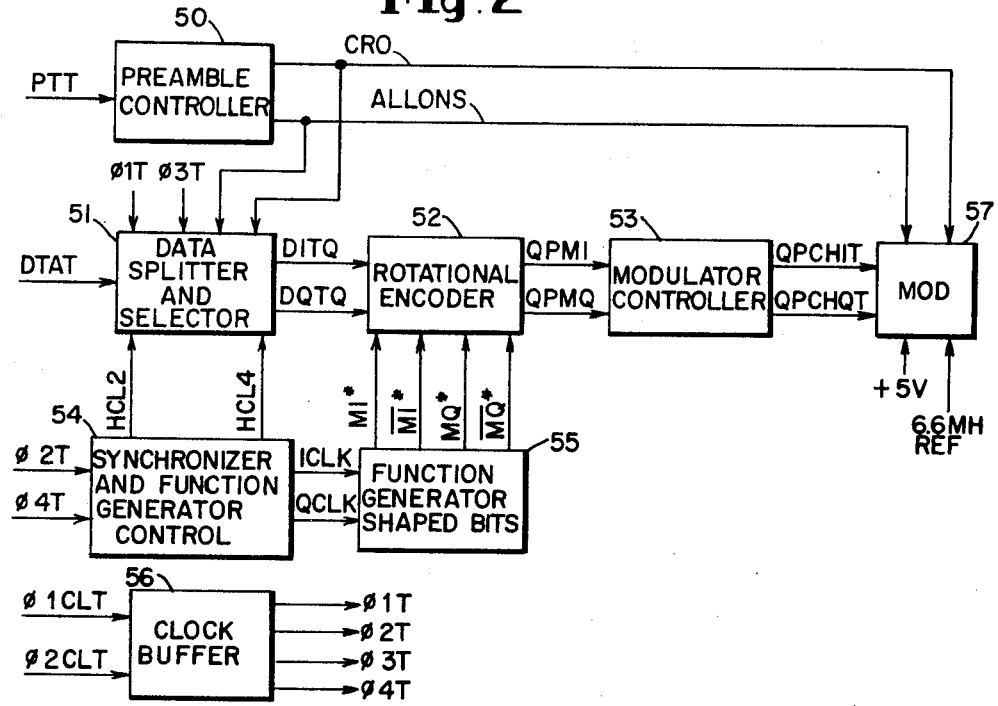
FIG. 2 is a block diagram of the circuitry included in a transmitter in accordance with a preferred embodiment of the present invention.

FIG. 2 is a block diagram of the apparatus at the transmitter for deriving the modulation which is imposed on a carrier at the transmitter. During the interval $T_1-T_2$ half cosine envelope shaping is provided in a pair of orthogonal I and Q channels (MSK equivalent modulation). A suppressed carrier modulator 57 is responsive to a reference carrier frequency source, such as a 6.6 MHz source at a reference phase. Modulator 57 operates in two modes in response to signals CRO and ALLONS, signals derived from preamble controller 50 during intervals $T_0-T_1$ and $T_1-T_2$, respectively. Preamble controller 50 is responsive to a push-to-talk button signal PTT. During the first interval, modulator 57 responds to a +5 volt reference source so that the carrier is modulated with a phase of +45 degrees. During the second interval, modulator 57 responds to outputs QPCHIT and QPCHQT of modulator controller 53 so that the carrier is alternately phase modulated with symbols I and Q.

Modulator controller 53 is responsive to output signals QPMI and QPMQ of rotational encoder 52. During normal signal transmission, subsequent to $T_2$, signals QPMI and QPMQ are mutually orthogonal half sinusoids which are selectively phase shifted in response to the binary value of a data signal DTAT. During the preamble portion, while signal ALLONS is being derived, during the interval $T_1-T_2$, orthogonal signals QPMI and QPMQ are half sinusoids that never have a negative value, as presented by wave forms 2 and 3, FIG. 1. To these ends, rotational encoder 52 is responsive to 4 mutually orthogonal sinusoidal waveforms MI*, $\overline{MI}$*, MQ*, and $\overline{MQ}$*, as derived from function generator 55. In addition, rotational encoder 52 is responsive to mutually orthogonal square wave signals DITQ and DQTQ, which during the interval $T_1-T_2$ have the same frequency and phase as signals MI* and MQ*, respectively.

Signals DITQ and DQTQ are derived by data splitter and selector 51, which is responsive to data signal DTAT, as well as clock square waves $\phi 1T$, $\phi 3T$, HCL2 and HCL4. Data splitter and selecter 51 is also responsive to signals CRO and ALLONS, as derived from preamble controller 50 so that signal DTAT is decoupled from the output of the data splitter and selector during the preamble interval. Square wave clock signals $\phi 1T$ and $\phi 3T$ are phase displaced from each other by 180 degrees, and are derived by clock buffer 56 in response to complementary square wave clock signals $\phi 1CLT$ and $\phi 2CLT$. Buffer 56 also derives complementary square wave outputs $\phi 2T$ and $\phi 4T$ which are orthogonal to squares waves $\phi 1T$ and $\phi T3$ respectively. Clock wave forms $\phi 2T$ and $\phi 4T$ are applied to synchronizer and function generator 54 which derives complementary output square wave signals HCT2 and HCL4, having a frequency one-half that of the square wave output of buffer 56. Synchronizer and function generator 54 also derives mutually orthogonal square wave outputs ICLK and QCLK, having a frequency one-half the output frequency of buffer 56. The transitions of HCL2 and HCL4 are synchronized with the transitions of waves $\phi 2T$ and $\phi 4T$ but the transitions of waves ICLK and QCLK are phase displaced from the transitions of waves $\phi 2T$ and $\phi 4T$. Waves ICLK and QCLK are applied to function generator 55 to derive the mutually orthogonal sinusoids MI*, $\overline{MI}$*, MQ* and $\overline{MQ}$* which have the same frequency and phase as signals ICLK and QCLK.

To control data splitter and selector 51 and modulator 57, preamble controller 50 includes a dual timer that is set in response to manual activation of a "push-to-talk" PTT button. Initially, the timer derives a first binary 1 output CRO during the interval $T_0-T_1$, while the carrier is transmitted at a reference phase of 45 degrees. Subsequently, the timer derives a second binary 1 output ALLONS for the interval required to perform bit synchronization. The CRO output is coupled to data splitter and selector 51, to inhibit all data transfer between the selector and encoder 52. While selector 51 is inhibited by the CRO output, modulator 57 is controlled so the DC voltage is applied to balanced mixers included in the modulator. During the second portion of the preamble, between $T_1$ and $T_2$, the data path between data splitter 51 and rotational encoder 52 is disabled. During this interval while signal ALLONS has a binary 1 value, square wave clock signal HCL2, in phase with normal data transitions from source DTAT, is coupled through the data splitter and selector as signal DITQ to rotational encoder 52. During this same interval, signal HCL4, orthogonal to signal HCL2, is coupled through data splitter 51 to rotational encoder 52 as signal DQTQ. These clock waves, at one-half the frequency of data source DTAT, enable simulation of alternating 1-0 data patterns in the I and Q channels to form an equivalent over-all 110011 data pattern. This is the desired data pattern during the interval $T_1-T_2$, which, after rotational encoding, produces a transmitted phase pattern 0 degrees, 90 degrees, 0 degrees, 90 degrees, etcetera. When the second interval has been completed, at $T_2$, signal ALLONS causes data splitter 51 and modulator 57 to operate in a normal manner so that the data signal DTAT is coupled to modulator 57 for rotational encoding, preferably as described in the copending, commonly assigned application Ser. No. 30,905 filed Apr. 17, 1979 entitled "QPSK Suppressed Carrier With Rotating Reference Phase".

Figure 3:
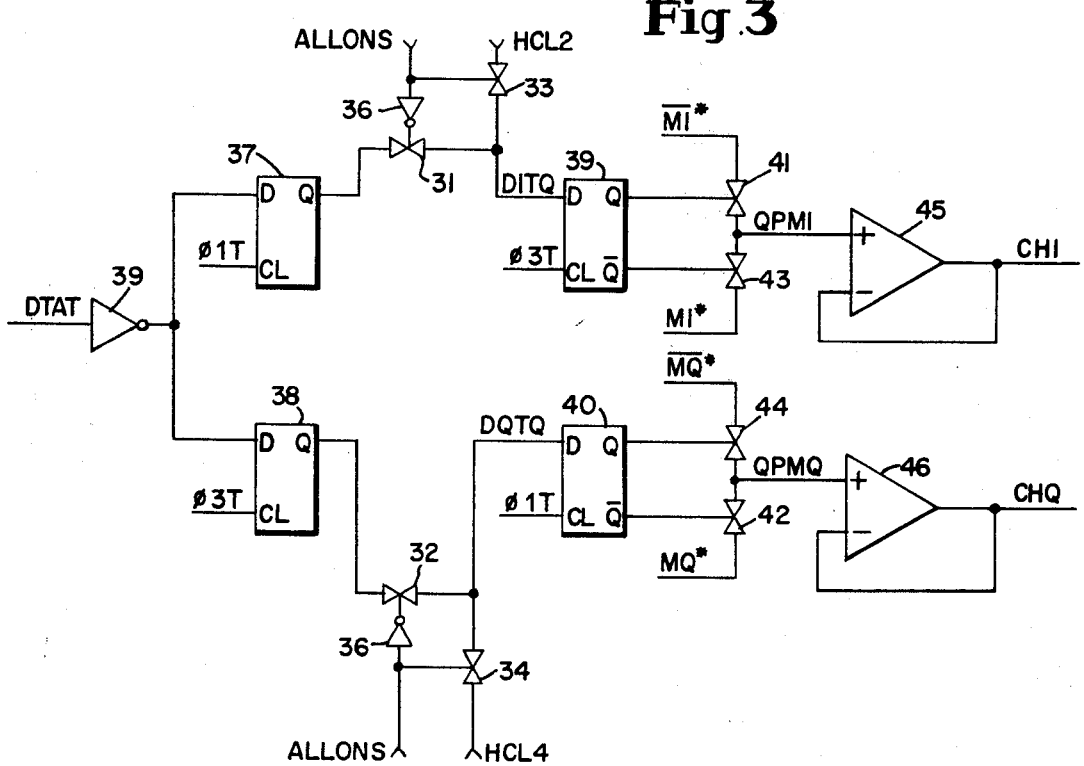
FIGS. 3 and 4 are circuit diagrams of portions of the apparatus included in the block diagram of FIG. 2.
Figure 4:
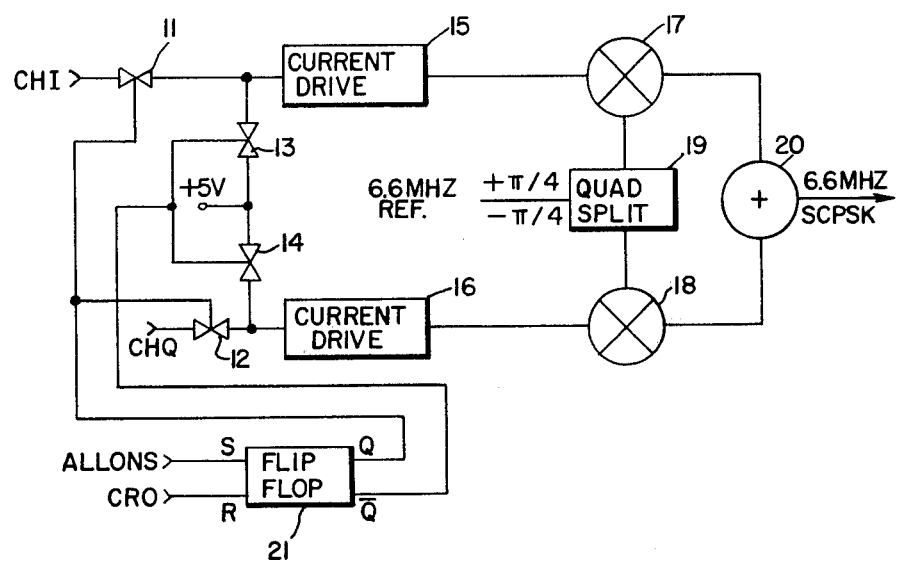

The details of data splitter 51, rotational encoder 52, modulator controller 53 and modulator 57 are illustrated in FIGS. 3 and 4.

Data splitter and selector 51 includes first and second orthogonal channels driven in parallel by the output of inverter 39, responsive to signal DTAT. The first orthogonal channel includes selectively cascaded flip-flops 37 and 39, while the second channel includes selectively cascaded flip-flops 38 and 40. In normal operation, subsequent to time T2, the signal at output terminals Q of flip-flops 37 and 38 are respectively coupled through electronic switches 31 and 32 to D input terminals of flip-flops 39 and 40. To this end, flip-flops 37 and 38 include D input terminals responsive to the output of inverter 39, as well as clock input terminals (CL) respectively responsive to clock wave forms $\phi1T$ and $\phi3T$. Q output terminals of flip-flops 37 and 38 are respectively coupled to D input terminals of flip-flops 40 via normally closed switches 31 and 32. During the interval $T_1-T_2$, while signal ALLONS is derived, switches 31 and 32 are open circuited and orthogonal square wave clock signals HCL2 and HCL4 are applied to D input terminals of flip-flops 39 and 40, respectively. To these ends, switches 31 and 32 are respectively controlled by inverted replicas of signal ALLONS, as coupled through inverters 35 and 36 to switches 31 and 32 respectively. Signal ALLONS is also applied as a control to switches 33 and 34 so that the switches are closed while signal ALLONS is derived to gate signals HCL2 and HCL4 through the switches to the inputs of flip-flops 39 and 40. Flip-flops 39 and 40 also include CL inputs respectively responsive to signals 3T and 1T.

Flip-flops 39 and 40 have complementary outputs Q and $\overline{Q}$ which control switches 41-44 to selectively gate sinusoids M1*, $\overline{M1}$*, MQ*, $\overline{MQ}$* as signals QPMI and QPMQ which are respectively applied to isolating operation amplifiers 45 and 46 which respectively derive output signals CHI and CHQ. While signal ALLONS is being derived, flip-flops 39 and 40 are activated so that the outputs of amplifiers 45 and 46 are half wave sinusoids always having a positive value, as indicated by wave forms QPMI and QPMQ, FIG. 1, during the interval $T_1-T_2$.

Output signals CHI and CHQ of amplifiers 45 and 46 are selectively applied through electronically controlled switches 11 and 12 to current drive sources 15 and 16, which are also selectively responsive to a $+15$ volt source coupled through switches 13 and 14. Current drive sources 15 and 16 are responsive to the $+5$ volt source during the period $T_0-T_1$, while signal CRO is derived; the current drive sources are responsive to signals CHI and CHQ during the preamble interval while ALLONS is being derived and subsequently while data are being transmitted. To these ends, there is provided flip-flop 21, having set (S) and reset (R) inputs respectively responsive to signals ALLONS and CRO. In response to the leading edge of signal CRO, flip-flop 21 is reset so that binary 0 and 1 levels are derived at the Q and $\overline{Q}$ outputs thereof. The Q and $\overline{Q}$ outputs of flip-flip 21 cause switches 11 and 12 to be open circuited, while closing switches 13 and 14, whereby the $+5$ volt DC level is applied to current drive sources 15 and 16, while signals CHI and CHQ are decoupled from the inputs of the sources. In response to the leading edge of signal ALLONS, flip-flop 21 is set, whereby signals Q and $\overline{Q}$ have binary 1 and 0 levels, which respectively cause switches 11 and 12 to close and switches 13 and 14 to open. Thereby, signals CHI and CHQ are coupled to the inputs of current drive sources 15 and 16 and the $+5$ volt source is decoupled from the current drive sources. Switches 11 and 12 remain closed during normal transmission, subsequent to the trailing edge of signal ALLONS because flip-flop 21 is unresponsive to the trailing edge of signal ALLONS.

The suppressed carrier quadrature phase modulated transmitter includes mixers 17 and 18 respectively responsive to output signals of current drive sources 15 and 16. In addition, mixers 17 and 18 are responsive to orthogonal outputs of quadrature splitter 19, in turn responsive to a reference carrier source, typically having a frequency of 6.6 MHz. The outputs of mixers 17 and 18 are linearly combined in adding circuit 20, which derives a suppressed carrier phase shift key signal at the frequency of the reference carrier. During the interval, while switches 13 and 14 are closed, and switches 11 and 12 are open, DC currents are supplied by drive sources 15 and 16 to mixers 17 and 18 and the output of adding circuit 20 is the reference frequency at a phase angle of 45 degrees. During the interval while signal ALLONS is being derived, signals CHI and CHQ are applied to current drive sources 15 and 16 so that the output of summing circuit 20 is the reference frequency at phases of 0 degrees, 90 degrees, 0 degrees, 90 degrees, etcetera.

When signal ALLONS has terminated, at $T_2$ and subsequent thereto, switches 33 and 34 are open circuited and switches 31 and 32 are closed, whereby signal DTAT controls activation of switches 41-44 to control coupling of the four orthogonally related sinusoids to inputs of amplifiers 45 and 46. Thereby, the suppressed carrier phase shift key modulator is activated to produce rotationally encoded OQPSK signals.

Figure 5:
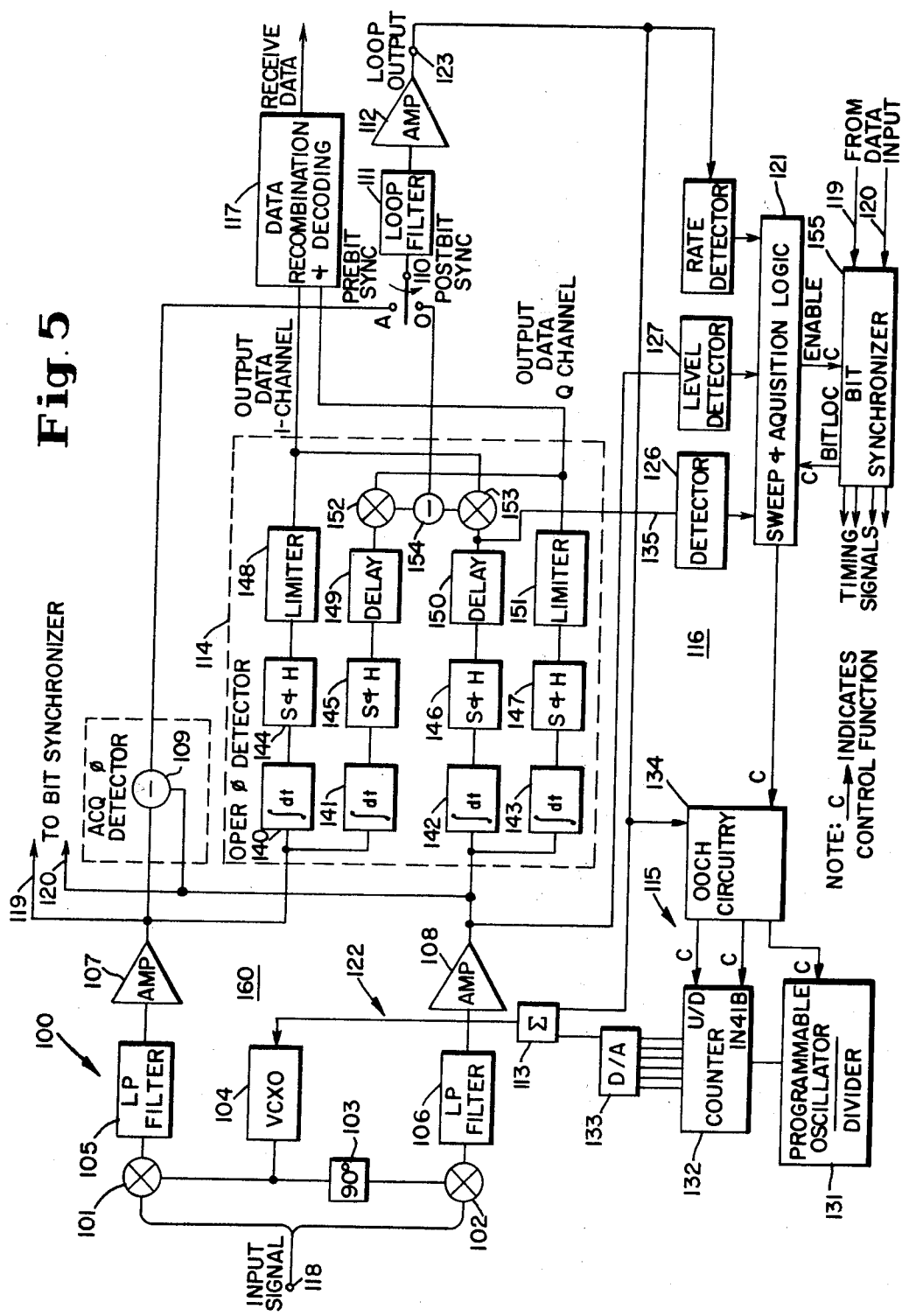
FIG. 5 is a block diagram of a receiver in accordance with a preferred embodiment of the present invention.

The suppressed carrier quadrature phase shift key wave is transmitted to a receiver and applied by lead 118 to a carrier tracking loop (CTL) of the receiver; the CTL is a critical element in signal acquisition. In FIG. 5 is illustrated a block diagram of the CTL and the related acquisition control system. Broadly, the CTL includes a basic demodulator 100, an acquisition phase detector 109, an operational phase detector 114 with associated timing generator 130, a sweep and OOCH generator 115, acquisition control and sensing circuitry 116, loop filter circuitry 111, loop amplifier 112 and summing circuit 113, bit synchronizer 115 plus data combination and decoding circuitry 117 (OOCH is a coined term for bi-directional sweeping with small increments). Sweep and OOCH generator 115 includes programmable oscillator/divider 131, counter 132, D/A converter 133 and OOCH circuitry 134. Acquisition control and sensing circuitry 116 includes rate detector 128, level detector 127, bit error rate (BER) detector 126 and sweep and acquisition logic 121. The operational phase detector 114 comprises: integrate-and-dump (I&D) circuits 140, 141, 142 and 143; sample-and-hold (S-H) circuits 144, 145, 146 and 147; limiters 148 and 149; control-inverters 152 and 153; and subtractor 154. Basic demodulator 100, used at all times, provides two quadrature channels of coherent demodulation respectively called the in-phase (I) channel and quadrature (Q) channel.

In the I channel, the output of reference VCXO 104 is supplied to one input port of balanced mixer 101 while the signal 118 from the receiver IF amplifier is supplied to the other input port of the mixer. VCXO 104 is always at or near the carrier frequency of the incoming signal 118. The desired demodulation product from mixer 104 is separated from spurious outputs of the mixer by low-pass filter 105. Amplifier 107 increases the output level of filter 105 to a more useful value. The operation is very similar in the Q channel, differing only with the addition of a 90 degree phase-shifting hybrid between VCXO 104 and balanced mixer 102. Low-pass filter 106 and amplifier 108 complete this channel.

In the carrier acquisition phase, I and Q channel outputs of amplifiers 107 and 108 are linearly subtracted in acquisition phase detector 109, having a nominal output of 0 degrees and a range of about ±45 degrees. The output of phase detector 109 is applied by means of terminal A in switch 110 through loop filter 111, amplifier 112 and summing amplifier 113 as a frequency control voltage on lead 122 of VCXO 104. This circuitry acts as a conventional phase locked loop (PLL). If and when the reference frequency of VCXO 104 is offset by less than the "capture bandwidth" of the loop from the carrier frequency of the input signal 118, the PLL acquires and locks onto the carrier on lead 118.

As mentioned supra, other performance considerations do not always permit the design of a PLL with a sufficiently large capture bandwidth. Under these conditions, resort is often made to a system for stepping or sweeping the VCXO frequency, as is the case in this invention. Hence, it is necessary to effectively disable frequency sweeping when the PLL has acquired lock. However, highly reliable recognition of a true lock condition under conditions of relatively rapid sweep rate and high BER is quite difficult to achieve. In accordance with one aspect of this invention, there is provided a novel combination for achieving this recognition and successfully stopping the VCXO frequency sweep at the optimum time for the next operation.

Once the sweep is stopped and loop acquisition has been achieved during the first preamble segment, during transmission interval $T_0-T_1$, the system awaits the second segment of the preamble, which occurs during transmission interval $T_1-T_2$. During this second segment, carrier lock is maintained and bit synchronizing information available from the I and Q channels on lines 119 and 120 controls bit synchronizer 155, which derives clock signals for control of detector 114 and the bit synchronizer itself. In each channel the waveshape appears as a series of half-cosine waves as shown in FIG. 1 as "preamble all ones". Bit synchronizer loop 155, described infra, acquires lock and recognizes this condition. When lock and recognition of the "preamble all ones" are performed by bit synchronizer 151, acquisition logic circuitry 116 drives switch 110 from position A to position 0, connecting the output of operational phase detector 114 to loop filter 111 to thereby control the CTL. After a necessary period for final stabilization, the CTL and bit synchronizer loops track the incoming signal to maintain stable phase references. Operational phase detector 114 of the CTL, having established a reference phase, is configured to maintain this reference independently of the four-way phase ambiguity represented by the possible data transmissions. Briefly this is accomplished by a "decision-directed loop" action of operational phase detector 114 similar in principle to that described by Lindsey and Simon in "Telecommunications Systems Engineering", FIG. 2-34.

Two essentially independent means of determining acquisition are employed in the present system. A tentative lock indication derived from rate detector 128 stops the sweep and the integrated level from level detector 127 verifies a threshold level after a predetermined interval to determine true acquisition. If the integrated level sensed by detector 127 is less than a predetermined value, the search is continued.

Another feature of this invention is a final protection against a long term dropout or a still possible but unlikely original false lock condition. If, at any time, the demodulated signal does not meet a pre-established BER criterion for a predetermined period of time, the acquisition sequence is re-enabled. This also makes it possible to respond to the termination of one transmission followed in short order by a second transmission from a different source.

Figure 6:
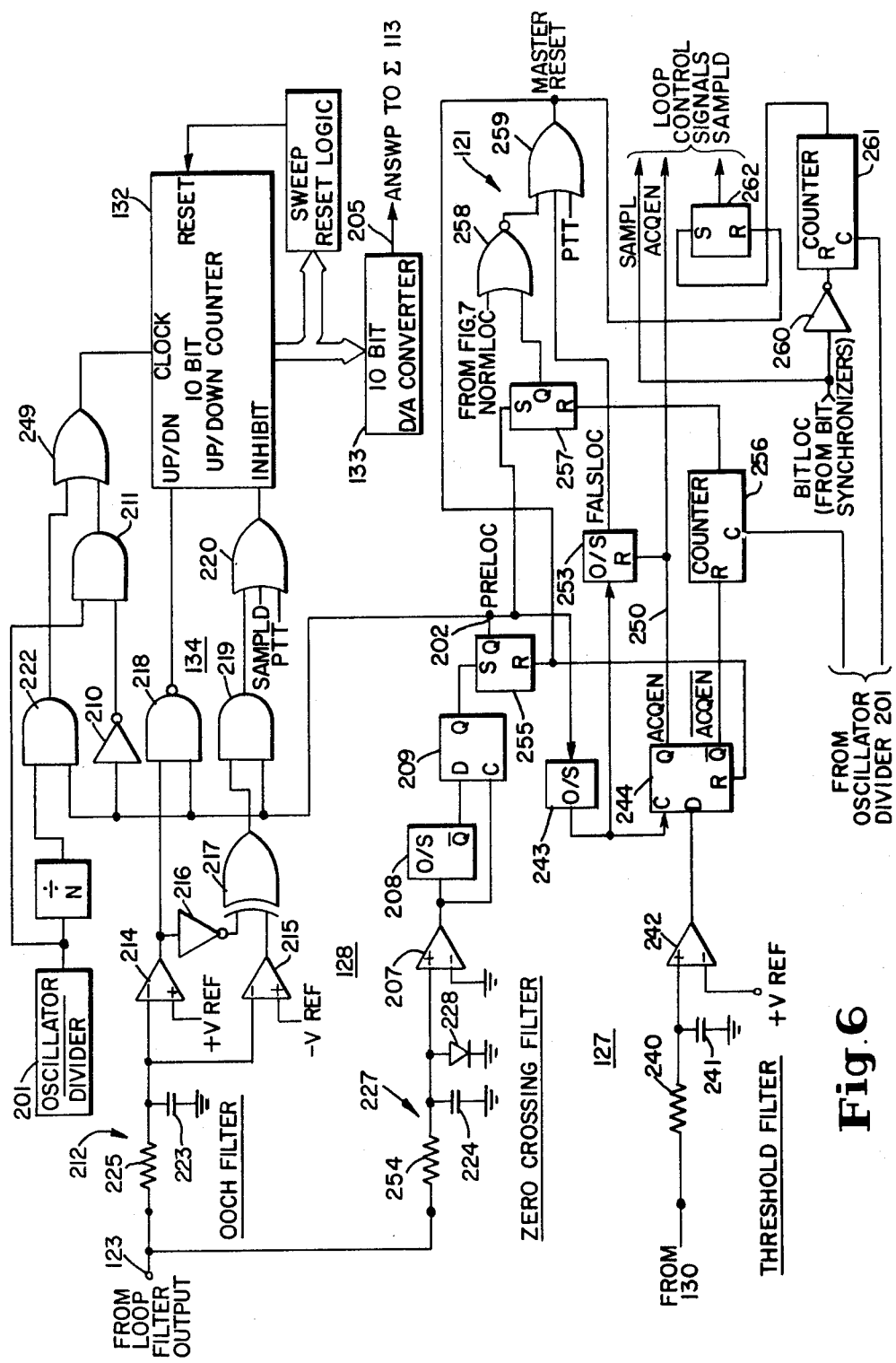
FIG. 6 is a circuit diagram of the sweep and acquisition logic circuitry included in the receiver of FIG. 5.

A block diagram of the sweep and acquisition control circuits is shown in FIG. 6 which should be considered with FIG. 5. The sweep and acquisition control circuits generate and control the generation of a sweep ramp which is added to the VCXO control line 122 during acquisition. The sweep and acquisition control circuits also control the entire sequence of operations in the loop from initial indication of acquisition to the final operating format as a decision directed recovery loop.

Prior to a tentative indication of signal acquisition being derived by a signal on PRELOC line 202, the 10-bit up-down counter 131 counts from an all zero state to a count of 1024 at a rate determined by programmable oscillator/divider 131. The output frequency of oscillator 131 is a function of the state of the acquisition sequence. The count of up/down counter 131 controls 10-bit D/A converter 133 such that, as the counter sequences, output ANSWP of the D/A converter on lead 205 produces a stepped approximation to a linear voltage ramp. The ANSWP ramp is added to the output of the loop filter 111 by summer 113 to produce the net VCXO control line voltage 122.

The amplified loop filter output derived by amplifier 112 on lead 123 is continuously monitored by the zero crossing rate detector 128. A first positive going zero crossing of the loop filter 111 output through zero crossing filter 227 and amplifier 207 triggers monostable multivibrator (i.e., one shot) 208. If the time to a second positive going loop filter 111 zero crossing is greater than the time constant of the monostable 208, the monostable times out and the second zero crossing clocks flip-flop 209 high, so the later flip-flop generates an initial lock indication (PRELOC) on line 202 which in turn controls flip-flop 209. The time constant of monostable 208 is chosen so that it is slightly greater than the period of the longest CTL full cycle expected before pull-in for the loop. This time constant guarantees that, excluding noise-induced inaccuracies, the second zero crossing represents the point at which the loop is passing through zero phase error, having already pulled-in. The values of series resistor 254 and shunt capacitor 224 in low pass zero crossing filter 227 are set to reduce noise without eliminating higher frequency zero crossings, while shunt diode 228 dampens out sweep induced transients.

When the PRELOC indication is derived on line 202, the normal sweep operation is disabled by the connection through inverter 210 to AND gate 211, causing control of up/down counter 131 to be shifted to OOCH circuit 134, which, by monitoring the DC level of the filtered loop output on lead 123, modifies the voltage added by the D/A converter 133 to the VCXO control line to drive the loop output on lead 123 to zero. Reducing the loop output removes, as much as possible, any static phase error in the loop which can lead to a BER performance degradation.

When the tentative lock condition is sensed with PRELOC line 202 high, a relatively direct connection from line 202 to AND gate 211 through inverter 210 disables the direct path from programmable oscillator 201 to the count input of 10-bit counter 131. The tentative lock condition enables an alternate path from oscillator/divider 201 to counter 131 via divide-by-N counter 221 through AND gate 222. The possible sweep rate is reduced by the factor N (typically 128) from the acquisition rate to the OOCH rate.

However, the threshold circuitry containing threshold amplifiers 214 nd 215, inverter 216, exclusive OR gate 217, AND gate 219 and OR gate 220 inhibits counter 131 unless and until the output of low pass OOCH filter 212, including series resistor 225 and shunt capacitor 223, has crossed one of the positive or negative threshold values respectively set by bias potentials applied to amplifiers 214 and 215. The direction of count at the crossing time is determined by the output level of NAND gate 218, in turn determined by the presence or absence of a threshold output of amplifier 214. The OOCH circuitry can therefore achieve slow frequency correction in either direction to insure that acquisition phase detector 109 is at a stable point near the center of its operating range.

Since it is quite possible for low frequency noise components at the loop filter output on leads 123 to generate PRELOC indications, an additional criterion aids in determining the presence of a valid signal, viz: by examining the level of the amplified Q channel lower sideband, as supplied by amplifier 108 to lead 130. The level is determined by level detector 127, which provides a synchronous amplitude indication and includes a low pass filter containing resistor 240 and capacitor 241. The filter output is compared with a fixed DC reference in amplifier 242. If the DC level derived from the filter exceeds the reference approximately 2 msec after the initial PRELOC indication, as established by the delayed clock pulse from one shot 243, signal ACQEN is derived from the Q output of flip-flop 244. If the level is insufficient, signal FALSLOC is generated a short time later from one shot 253. FALSLOC is supplied through OR gate 259 to force PRELOC low, via the connection to the reset input of flip-flop 255 through OR gate 259 and to remove control of up-down counter 131 from OOCH circuit 134 so the sweep may continue from that point in response to the output of OR gate 249.

The signal ACQEN has two functions. First, it controls the configuration of the CTL filter 111 by changing the loop to an intermediate bandwidth which, being narrower than the acquisition bandwidth, minimizes the possibility of the loop slipping out of lock and maximizes the ability of the bit synchronizer to find the valid symbol timing. Second, ACQEN signal bit synchronizer 155 that a valid carrier acquisition has occurred so that the synchronizer may start searching for the proper symbol timing in the symbol sync portion of the preamble which is to follow. When bit synchronizer 155 has locked, it informs the carrier recovery loop through the signal BITLOC. The carrier recovery loop may switch to a decision directed format only when the bit timing is accurately known. Therefore, the signal BITLOC forces mode control line (SAMPL) for phase detector 114 high and causes loop 100 to go into sampled data operation. After a delay, which is determined by counter 261 and is a function of the operating mode, OOCH circuit 134 is disabled and CTL filter 111 is switched to its final operating bandwidth by the signal SAMPLD, derived from flip-flop 262, having set and reset inputs respectively responsive to counter 261 and OR gate 259. Counter 261 provides the delay, as it derives an output after a predetermined number of pulses have been applied to a clock (C) input thereof by oscillator 201, subsequent to resetting by signal BITLOC being fed through inverter 260. This delay is incorporated to avoid too many simultaneous transients in the loop; the simultaneous transients may force the loop out of lock. OOCH disabling is provided by supplying SMAPLD to the inhibit input of clock 132 via OR gate 220, also responsive to PTT and the output of OOCH circuit 134.

When the loop has entered its final operating configuration, a reset to its initial sweep configuration may only be forced by (1) the operator activating the transceiver into transmit (PTT goes high), (2) a manual mode change which the operator performs as a function of received signal quality, as described infra, or (3) a determination by detector 126 that the bit error rate is sufficiently high as to prevent continued efforts or demodulation (NORMLOC goes low). The signal NORMLOC is derived by the apparatus illustrated in FIG. 7 by comparing a voltage roughly proportional to BER to a predetermined threshold voltage. If the voltage of one of the sample and hold integrated channels, e.g., the Q channel, on line 135 (FIG. 5) supplied to BER detector 126 exceeds the threshold for a sufficient period of time, the NORMLOC input to NOR gate 258 (FIG. 6) goes low. NOR gate 258 is also responsive to the Q output of flip-flop 257, having a set input responsive to signal PRELOC and a reset input that is activated a predetermined interval after PRELOC has been derived, a result achieved by connecting the output of downward counter 256 to the reset input. Counter 256 is reset by signal PCQEN at the $\overline{Q}$ output of flip-flop 244 and is clocked by the output of oscillator 201. Hence, NORMLOC can control resetting only if it has a low value a predetermined interval after PRELOC was set to a high value. The resulting high output of gate 258 that is fed through OR gate 259 provides a high output to the master reset line to reset flip-flops 202, 244 and 262 and enable the acquisition sequence.

Figure 7:
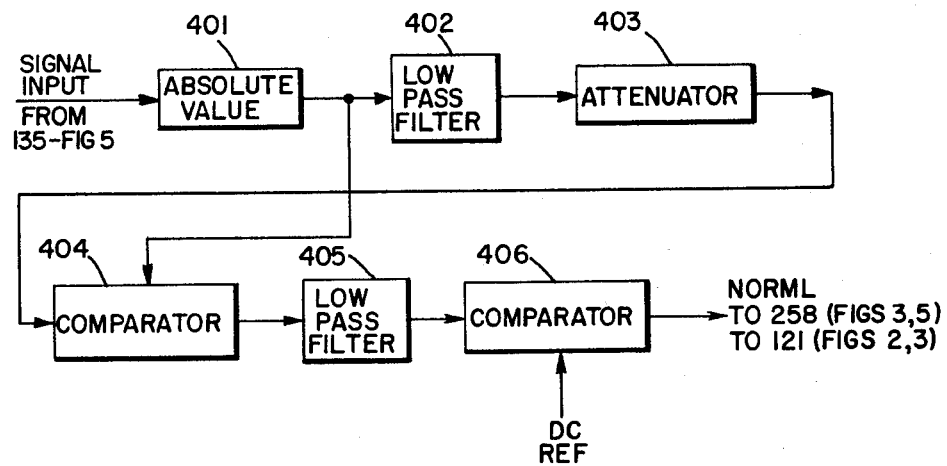
FIG. 7 is a block diagram of the bit error rate detector included in the receiver of FIG. 5.

BER detector 126, illustrated in detail in FIG. 7, responds to the sampled and held signal voltage from channel Q on line 135, which voltage is applied to absolute value circuit 401. The output of circuit 401, containing a DC value with a variance due to noise, is split in two parallel paths. A first path, through low pass filter 402, produces a DC value that is reduced by attenuator 403, as required for the desired operating BER threshold, and applied as a reference to high gain differential amplifier comparator 404. The unfiltered, unattenuated, absolute value output signal of circuit 401 is applied directly to the other input of the comparator 404. Therefore, the output of comparator 404 has a bi-level state condition, with the transition occurring where the two input levels are equal. In effect, the average output level of comparator 404 relative to one of the state levels is proportional to the percentage of time that the noisy input signal level falls below the reference level. Low pass filter 405 responds to the output of comparator 404 to produce this average level and has a sufficiently long time constant to prevent it from reacting to relatively short signal drop-outs. Comparator 406, responsive to filter 405, is another differential amplifier with a reference DC voltage chosen in consonance which the value of attenuator 403 to produce a reaction at the desired BER condition. The output of threshold circuit 406, NORMLOC, is applied to NOR gate 258 (FIG. 6) of sweep and acquisition logic circuit 121 (FIG. 5).

This approach has notable advantages over more conventional signal to noise ratio (SNR) designs; viz: (1) it is insensitive to absolute signal levels since a fraction of the average (DC) signal value is compared to the full instantaneous signal level in a ratio comparison effectively performed by comparator 404; (2) the percentage of time the instantaneous level falls below a certain fraction of the nominal value has a closer relationship to BER than does SNR; and (3) the signal information necessary to make a simple measurement is readily available from integrate-and-dump sample-hold circuitry.

Figure 8B:
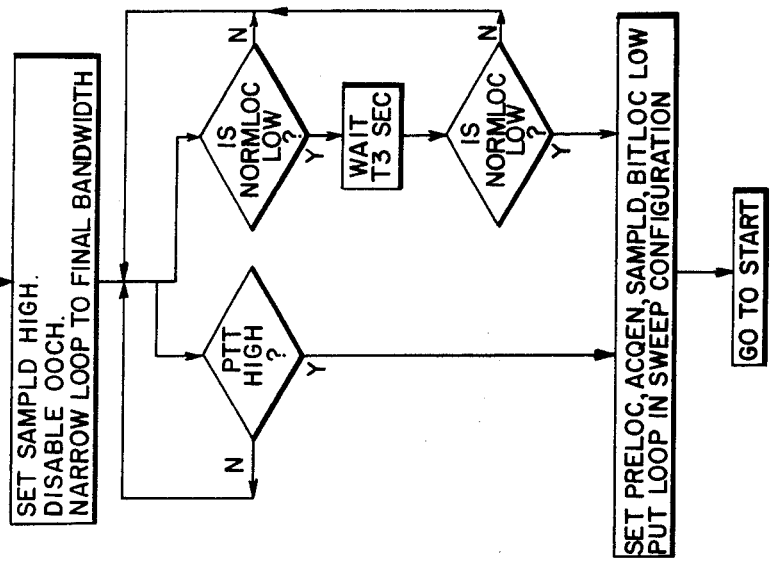
FIGS. 8a and 8b, together, are flow diagrams of the operations associated with the carrier recovery loop acquisition process of the receiver illustrated in FIG. 5.
Figure 8A:
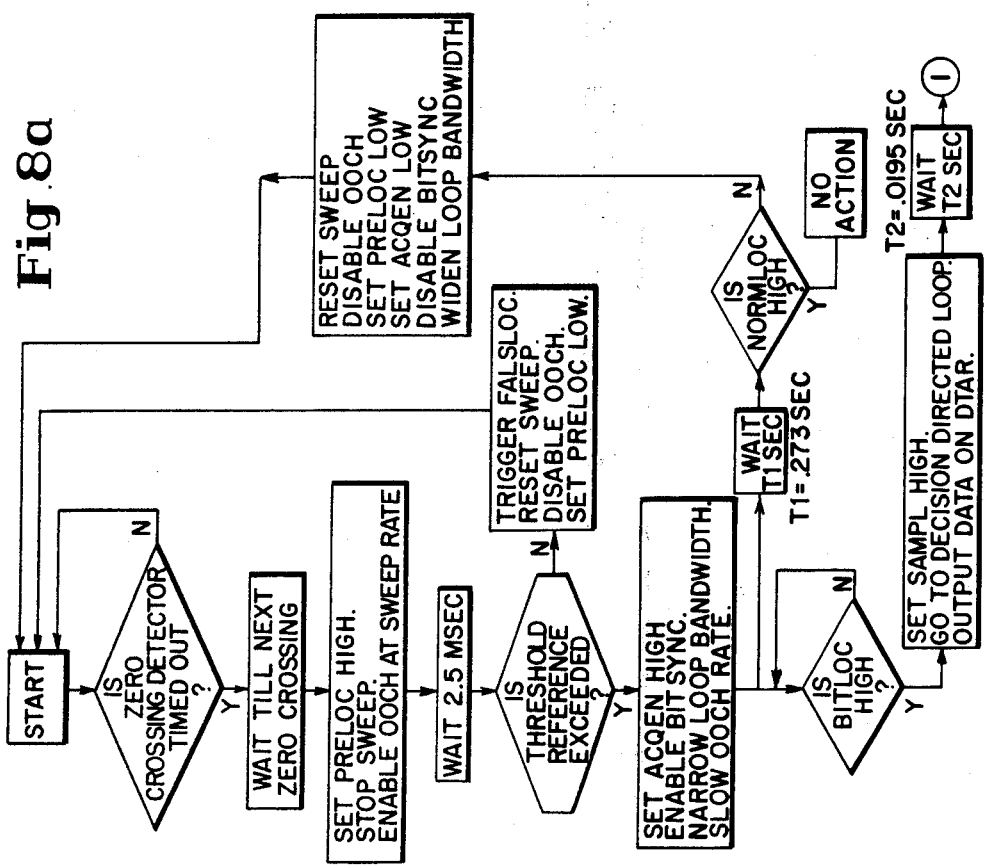

A flow chart of the full acquisition sequence is given in FIGS. 8a and 8b.

Figure 9:
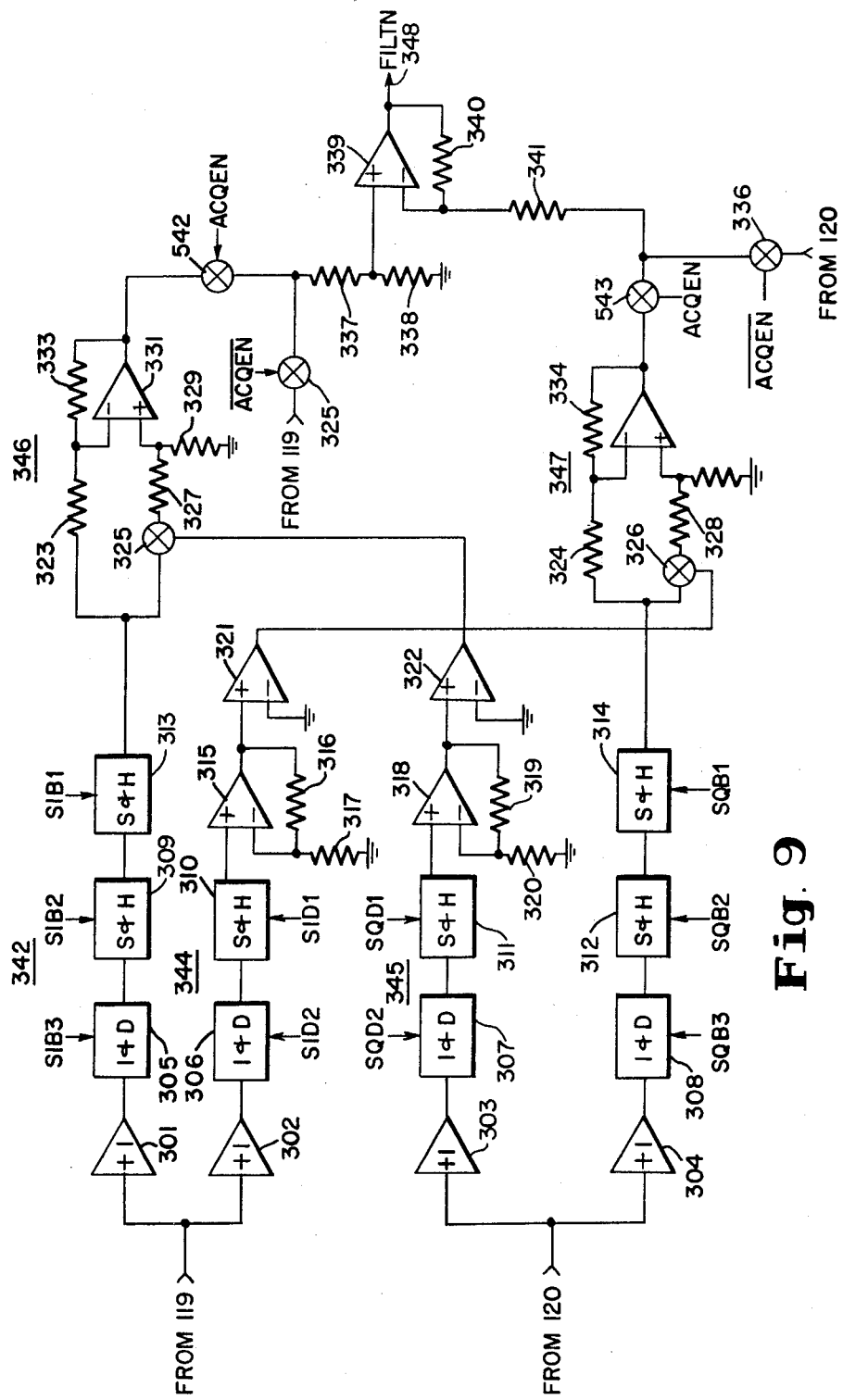
FIG. 9 is a circuit diagram of a decision directed loop phase detector included in the receiver of FIG. 5.
Figure 10:
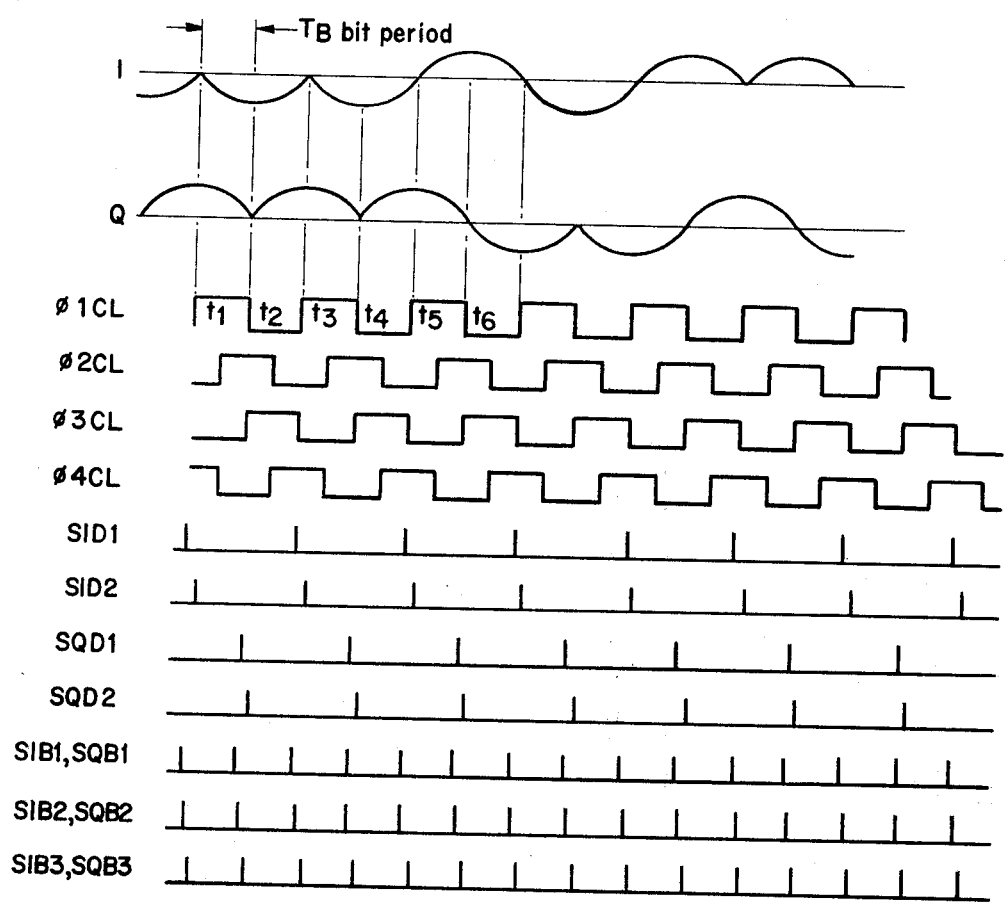
FIG. 10 represents wave forms derived in the receiver of FIG. 5.

FIGS. 9 and 10 are respectively illustrations of the optimum-performing, yet practical-to-implement decision-directed loop phase detector 114 (FIG. 5) and waveforms associated with the detector. Detector 114 basically includes an I proportional channel 342 and a Q proportional channel 343, two quadrant-recognition channels 344 and 345 and selectable polarity amplifiers 346 and 347. Detector 114 also includes switches 542 and 543 which supply signals derived by the decision-directed phase detector to subtractive amplifier 339 after acquisition has been indicated by signal ACQEN. Detector 114 includes switches 335 and 336 which enable signals to bypass detector 114 during the pre-acquisition interval in response to signal ACQEN. Amplifier 339 corresponds to subtractor 154, FIG. 5, while the integrators, sample and hold circuits, and delay elements of FIG. 5 have corresponding components in FIG. 9.

If the signal were always contained within the first quadrant (0 degrees to 90 degrees) in a manner similar to the second segment of the preamble, during transmission interval $T_1$-$T_2$, phase detector 114 could function without quadrant recognition channels 334 and 335 and amplifiers 346 and 347 could operate with a fixed, non-inverting polarity. In full circuit operation, a signal in the first quadrant activates switches 325 and 326 through channels 345 and 344 respectively. An opposite signal in the third quadrant activates neither of switches 325 nor 326 because of the reverse signal polarity and because the inversion in signal polarity in channels 342 and 343 is cancelled by the polarity inversions of amplifiers 346 and 347. Thus there is the same phase error correction action as for a signal in the first quadrant. In effect, a shift in phase clockwise provides a positive increase in the output of the I channel amplifier 346 relative to that of the Q channel amplifier 347, providing a net positive change on output line 348. In a similar manner the action of the polarity correction circuitry in the other two quadrants provides a net positive change for a clockwise average phase rotation in input signal. In any case, the ideal stable phase condition is one wherein the average phase during a sample interval tends to bisect the angles formed by the IQ coordinate system, being one of the values +45 degrees, +135 degrees, +225 degrees or 315 degrees. For these angles, the outputs of amplifiers 346 and 347 are equal and the subtraction in amplifier 339 produces an output of zero volts. Departures from these angles produce a VCXO frequency change tending to correct the error.

The improved performance of the present decision-directed loop over less elegant approaches results from the use of maximum possible integration time before polarity decision in channels 344 and 345. With less or sometimes nearly zero integration time, noise can unnecessarily cause incorrect decisions for periods of time. Incorrect decisions reverse the loop action to cause divergence, instead of convergence, and significantly degrade the phase stability of the reference VCXO.

As discussed supra, the basic principles of quadriphase decision-directed loops are shown in a mathematical block diagram by Lindsey and Simon. In the present invention, the basic principles are applied to the more difficult-to-implement offset QPSK demodulation with the employment of simple, low cost and power consumpting integrate-and-dump and sample-hold circuitry. By performing the integration function before the necessary delay, expensive continuously operating analog delay components are avoided. To attain correct operation of detector 114, bit synchronizer 155 includes clock circuitry that derives mutually orthogonal clock signals $\phi 1CL$, $\phi 2CL$, $\phi 3CL$ and $\phi 4CL$ having the same frequency as the I and Q channel half sinusoids, i.e., when a true sinusoid is derived in the channel I, the clock signal has a frequency twice that of the sinusoid. For perfect synchronism, the binary 1 levels of $\phi 1CL$ and $\phi 3CL$ respectively occur during the first and second halves of the I channel half sinusoids, while the binary 1 levels of $\phi 2CL$ and $\phi 4CL$ respectively occur during the first and second halves of the Q channel half sinusoids. The clock circuitry also derives waveforms SID1, SID2, SQD1 and SQD2, as well as waveforms SIBZ, SQBZ, SIB2, SQB2, SIB3 and SQB3. Pulses of waveforms SID1, SID2, SQD1, and SQD2 occur at the same frequency as $\phi 1CL$–$\phi 4CL$, with the pulses of waveforms SID2 and SQD2 respectively occurring simultaneously with the positively going transitions of $\phi 1CL$ and $\phi 3CL$. Pulses of waveforms SID1 and SQD1 occur slightly before the pulses of waveforms SID2 and SQD2, respectively to enable integrated values derived in response to SID2 and SQD2 to be sampled and held. Waveforms SIB1, SQB1, SIB2, SQB2, SIB3 and SQB3 are derived at twice the frequency of $\phi 1CL$–$\phi 4CL$, with the pulses of waveforms SIB3, SQB3 occurring simultaneously with transitions in $\phi 1CL$ and $\phi 3CL$. The pulses of waveforms SIB2, SQB2 occur slightly before the pulses of waveforms SIB3, SQB3 while the pulses of waveforms SIB1, SQB1 occur slightly before those of SIB2, SQB2.

Referring now to FIGS. 9 and 10 in combination, it is desired, for example, to apply the I channel 344 polarity correction, as integrated over the interval of one positive half cycle of the I channel sinusoid, i.e., over the clock periods $t_1$ and $t_2$, to the Q channel sample integrated over the period $t_2$ as well as that sample from period $t_1$. Therefore in I channel 344, pulse SID2 provides I channel integration in integrate and dump circuit (I&D) 306 over the double interval $t_1$ and $t_2$ while pulse SID1 holds the resultant value over periods $t_3$ and $t_4$ via sample and hold circuit (S-H) 310. The output of S-H 310 drives Schmidt trigger 315 and buffer 321 to control switch 326 in polarity-reversible amplifier 332. Similarly in Q channel 343, pulse SQB3 provides integration in I&D 308 over period $t_1$ which is delayed one period each by S-H 312, controlled by pulse SQB2, and S-H 314, controlled by pulse SQB1, so that the result appears at the input to amplifier 347 for the duration of period $t_3$. The result of the integration performed over the second period $t_2$ appears at the input of amplifier 347 for the period $t_4$.

In an identical manner, the result of the Q channel 345 integration over the interval of one positive half cycle of the Q channel sinusoid, i.e., over the double periods $t_2$ and $t_3$, performed by I&D 307 and held by S-H 311, controls the polarity of amplifier 346 via elements 319, 322 and switch 325 during the periods $t_4$ and $t_5$ for the two integration results in I channel 342 for periods $t_2$ and $t_3$. These integrations are performed by I&D 305 and delayed by S-H 309 to be held by S-H 313 for the respective periods t₄ and t₅.

Resistors 323, 327, 329 and 333, associated with amplifier 331, and resistors 324, 328, 330 and 334, associated with amplifier 332, are apportioned in well-known fashion to provide equal gain in either polarity. Closing of either switch 325 or 326 provides non-inverting amplification by the respective amplifier 331 or 332 while an open in the appropriate switch provides inverting amplification of equal absolute value.

Figure 11:
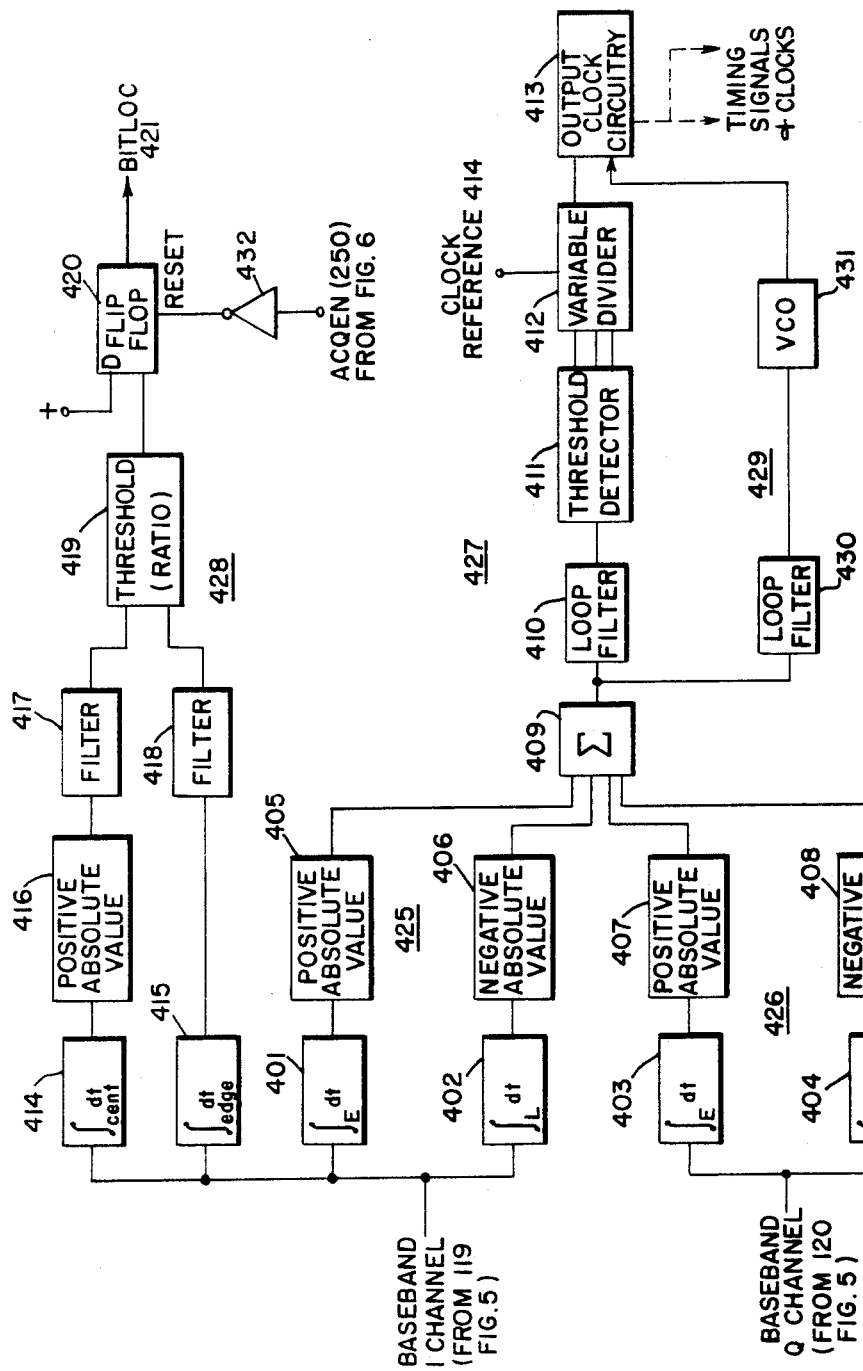
FIG. 11 is a block diagram of the bit synchronizer and lock detector in the receiver of FIG. 5.

FIG. 11 is a block diagram of the early-late gate absolute value (ELAV) bit synchronizer 155. Synchronizer 155 separately processes output signals of the I and Q channel on lines 119 and 120, FIG. 5, to obtain the maximum synchronizing information from the total data stream. The output of the early integrator 401 passes through positive absolute value circuitry 405 while the output of the late integrator 402 passes through negative absolute value circuitry 406. These two outputs from the I channel 425 are added to similar absolute value integrated outputs of Q channel 426 in summer 409 to provide the phase error indication. To these ends, channel 426 includes early and late integrators 403 and 404. To provide the proper timing for integrators 401–404, early integrators 401 and 403 are respectively activated for the same relative portion of the binary 1 (high) intervals of clock signals $\phi 1CL$ and $\phi 3CL$, and late integrators 402 and 404 are respectively activated for this same relative portion of the binary 0 intervals of clock signals $\phi 1CL$ and $\phi 3CL$.

A digital phase correcting loop 427 in conjunction with a stable clock reference 414, is used to derive the timing signals and clocks whenever the known stability of the received signal permits. Loop 427 includes loop filter 410, threshold detector 411 and variable divider 412 to take advantage of the stable transmitted clock frequency to provide phase-only correction for the stable clock reference 414, thereby avoiding large transient errors and achieving high immunity to short term signal loss. If the incoming signal characteristics are known to be more unstable, so stable clock reference 414 can be effectively used, the more conventional VCO base loop including VCO 431 and loop filter 431 is used. The choice as to whether reference 414 or VCO 413 is to be used is made by manual mode selection. The switching function for the output of divider 412 or VCO 431 is included in the output clock circuitry 413 which includes conventional divider and pulse shaping circuits to provide clocks in various required phases, as illustrated by waveforms $\phi 1CL$, $\phi 2CL$, $\phi 3CL$, $\phi 4CL$, SID1, SID2, SQD1, SQD2, SIB1, SIB2, SIB3, for the bit-synchronizer and carrier tracking loop.

Recognition of bit synchronization is achieved by circuit 428. This circuit performs in an optimum manner to discriminate against causes of faulty lock indications in more conventional approaches. For instance, detectors which rely upon a near-zero control line output of the bit synchronizer loop to indicate locks are vulnerable to absence of signal input; those which rely upon recognition of input signal transitions at or near bit rate periods are vulnerable to similar transitions due to an unlocked CTL; those which measure the output level of a single early or late gate circuit are vulnerable to a condition of CTL lock on an unmodulated carrier.

The present approach uses two integrators. Integrator 414 operates over the center of the I channel expected bit interval where the energy is highest, while integrator 415 is centered about the I channel transition interval where the energy is lowest. To these ends, integrator 414 is activated during a portion of the interval while clock signal $\phi 2CL$ has a binary 1 value while integrator 415 is activated during the same portion of the interval while clock signal 4CL has a binary 1 value. Positive absolute value circuit 416 responds to the output of integrator 414 and feeds low pass filter 417, having a time constant of many bit intervals. There is no absolute value circuitry responsive to integrator 415 since it is not desirable or necessary; under true lock conditions the average value derived from integrator 415 approaches zero for random data transitions. Filter 418 responds directly to the output of integrator 415 and has a time constant approximately the same as filter 417. Threshold ratio detector 419 is used in lieu of conventional comparators to provide a bit sync indication essentially independent of signal level. Flip-flop 420 stores the information and provides the BITLOC output signal on lead 421, which is coupled to sweep and acquisition control circuit 155 where it is converted into signals SAMPL and SAMPLD. Flip-flop 421 is reset through inverter 432 by the ACQEN recognition output derived on line 250 in FIG. 6.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of achieving bit timing references at a receiver for a carrier modulated by OQPSK, the modulation being achieved with a pair of orthogonal components, comprising transmitting the carrier with a constant reference phase modulation during a first interval, then during a second interval transmitting the carrier with rotational phase modulation representing binary bit values so that the orthogonal components phase modulate the carrier with a predetermined bit sequence at the receiver; responding to the carrier with constant phase modulation to lock the frequency and phase of a variable frequency oscillator of a carrier recovery loop including a loop filter driven by outputs of orthogonal processing channels responsive to the oscillator; then responding to the carrier with rotational phase modulation to achieve bit synchronization at the receiver with the bits modulating the carrier while maintaining the frequency and phase lock; activating the carrier recovery loop to decision directed operation after achieving bit synchronization, the decision directed operation being achieved by sampling and comparing components derived in the orthogonal channels in response to the carrier with rotational phase modulation; reducing the bandwidth of a filter used in achieving bit synchronization after the decay of transients in the carrier tracking loop resulting from a transition between locking of the loop and initiation of the decision directed operation; and then adjusting the bandwidth of the carrier tracking loop as a function of the quality of the received rotational modulated suppressed carrier.

2. The method as claimed in claim 1 wherein the bit sequence causes the orthogonal modulating components to be half sinusoids of one polarity.

3. The method as claimed in claim 1 or claim 2 wherein the reference phase is displaced 45 degrees from both orthogonal modulating components.

4. The method as claimed in claim 1 wherein the reference phase is displaced 45 degrees from both orthogonal modulating components and wherein bit error rate is determined from a comparison of the average and instantaneous values of the absolute value of the signal in at least one orthogonal processing channel.

5. The method as claimed in claim 4 further including effectively determining the number of times the instantaneous value exceeds the average value over a predetermined interval, and in response to the number of times determination exceeding a predetermined level increasing the carrier tracking loop bandwidth.

6. The method as claimed in claim 1 wherein bit synchronization is achieved by integrating components of at least one of the orthogonal processing channels over differing periods of the same bit value, said integrated components having approximately the same value when bit synchronization is achieved, and in response to a comparison of the integrated components controlling the phase of a clock source that controls the carrier control loop during decision directed operation and the integration intervals involved in bit synchronization.

7. The method as claimed in claim 1 wherein bit synchronization is achieved by integrating components of both of the orthogonal processing channels over differing periods of the same bit value, said integrated components in each processing channel having approximately the same value when bit synchronization is achieved, and in response to a comparison of the integrated components of both channels controlling the phase of a clock source that controls the carrier control loop during decision directed operation and the integration intervals involved in bit synchronization.

8. The method as claimed in claim 6 or claim 7 wherein the bit sequence causes the orthogonal modulating components to be half sinusoids of one polarity and wherein one of the integrations is performed over an interval extending from a first zero value of the processing channel half sinusoids to a time $T_A$, where $T_A$ is less than $T_B$, the period of the half sinusoid, and another of the integrations is performed over an interval extending from time $(T_B-T_A)$ to the next zero value of the processing channel half sinusoids, said periods starting and ending at said times only when bit synchronization has been achieved.

9. The method as claimed in claim 1 wherein an indication that bit synchronization has been achieved is derived by integrating components of one of the orthogonal processing channels over differing periods of adjacent bit values and comparing the integrated components to provide the indication.

10. The method as claimed in claim 9 wherein an indication that bit synchronization has been achieved is derived by integrating components of one of the orthogonal processing channels over differing periods of adjacent bit values, and comparing the integrated components to provide the indication and wherein one of the integrations is performed over an interval extending between a first zero value of the processing channel half sinusoid and a time $T_C$, where $T_C$ is less than $T_B/2$, and $T_2$ is the period of the half sinusoid, and another of the integrations is performed over an interval extending from time $(T_B/2-T_D)$ to time $T_B/2+T_D)$, where $T_B$, $T_C$ and $T_D$ have values such that the integration periods do not overlap.

11. The method as claimed in claim 1 wherein the bit sequence causes the orthogonal modulating components to be half sinusoids of only one polarity, and the decision directed operation is achieved by determining the amplitude of the proportional components in each of the orthogonal processing channels, and comparing the proportional components.

12. The method as claimed in claim 8 wherein decision directed operation is achieved for OQPSK data modulation subsequent to the second interval by determining the amplitude of quadrature components in each of the orthogonal processing channels, and controlling the polarity of the proportional components supplied to the loop filter in response to the polarity of the quadrature components.

13. Apparatus for synchronizing a receiver of a carrier modulated by OQPSK binary bits, the carrier being initially phase modulated with a constant reference phase and then modulated with rotational phase modulation representing a predetermined sequence of binary bit values and subsequentially modulated by binary data bit values, said apparatus comprising:

a carrier recovery loop including: a variable frequency oscillator, a pair of orthogonal demodulation channels responsive to the oscillator and the modulated carrier, a decision directed detector responsive to the channels for deriving a decision directed indication and a loop filter responsive to outputs of the channels, said carrier recovery loop being responsive to the carrier with constant phase modulation to lock the oscillator to the carrier frequency and reference phase;

a bit synchronizer responsive to demodulated signals in the orthogonal channels while the carrier is rotationally phase modulated by the predetermined bit sequence, said bit synchronizer including means responsive to the demodulated signals for deriving timing waves synchronized with bits of the demodulated signals for the carrier recovery loop and the bit synchornizer, said timing wave deriving means including a filter for controlling the phase of the waves, said carrier recovery loop being maintained in a locked condition while the timing waves are being synchronized to the bits of the demodulated signals;

said carrier recovery loop including means for combining sampled components derived in the orthogonal channels in response to the rotationally phase modulated carrier and for supplying the combined sampled components to the loop filter;

means for reducing the bandwidth of the bit synchronizer filter after decay of transients in the carrier tracking loop resulting from a transition between locking of the carrier recovery loop and initiation of the decision directed operation;

means responsive to at least one demodulated component for deriving an indication of the quality of the received rotational modulated suppressed carrier; and means for controlling the carrier recovery loop bandwidth in response to the indication.

14. The apparatus of claim 13 wherein the carrier recovery loop includes a phase detector responsive to demodulated components of the orthogonal channels for deriving an indication of the phase difference between the two channels, switch means for selectively coupling the phase difference and decision directed indications to the loop filter, means for detecting the period between adjacent zero crossings of an output of the loop filter, and means for controlling the switch means in response to the period detecting means.

15. The apparatus of claim 14 further including means for sweeping the output frequency of the oscillator, and means for controlling the rate of sweeping in response to the period detecting means.

16. The apparatus of claim 15 wherein the switch control means includes means for detecting the amplitude of the filter output more than a predetermined time subsequent to detection of adjacent zero crossings exceeding a predetermined period.

17. The apparatus of claim 16 further including means for controlling operation of the bit synchronizer in response to outputs of the amplitude and period detecting means.

18. The apparatus of claim 16 or claim 17 further including means for controlling the loop filter bandwidth in response to outputs of the amplitude and period detecting means.

19. The apparatus of claim 16 or claim 17 further including means for controlling the oscillator sweep rate in response to outputs of the amplitude and period detecting means.

20. The apparatus of claim 17 further including means for controlling the loop filter bandwidth and oscillator sweep rate in response to outputs of the amplitude and period detecting means.

21. The apparatus of claim 20 further including means responsive to one of the demodulated components for detecting whether bits derived from the bit synchronizer are locked in synchronism to bits rotationally modulating the carrier, and means responsive to the bit lock detecting means for controlling operation of the decision directed loop.

22. The apparatus of claim 13 further including means responsive to one of the demodulated components for detecting whether bits derived from the bit synchronizer are locked in synchronism to bits rotationally modulating the carrier, and means responsive to the bit lock detecting means for controlling operation of the decision directed loop.

23. The apparatus of claim 21 or claim 22 wherein the bit lock detecting means includes means for comparing the energy in the center of one of the rotational phase modulated bits in the sequence with the energy at the edge of that bit and an adjacent bit.

24. The apparatus of claim 13 wherein the bit synchronizer includes means for comparing the energy content at the beginning of a bit in one of the channels with the energy content at the end of the same bit in said one channel.

25. The apparatus of claim 24 wherein the bit synchronizer further includes means for comparing the energy content at the beginning of a bit in the other of the channels with the energy content at the end of the same bit in said other channel.

26. The apparatus of claim 13 wherein the decision directed loop includes proportional detecting means for the components in each of the channels, said loop filter being responsive to a combination of responses from the proportional detecting means while the channels are demodulating the predetermined sequence of bits.

27. The apparatus of claim 26 wherein the decision directed loop further includes orthogonal detecting means for the components in each of the channels, and means for controlling the polarity of the proportional components combined by the loop filter in response to the polarity of components detected by the orthogonal detecting means while the loop is responsive to the binary data bits.

28. The apparatus of claim 26 wherein the means for deriving an indication of the quality of the received carrier includes means for detecting bit error rate.

29. The apparatus of claim 28 wherein the means for detecting bit error rate includes means responsive to the proportional detecting means for comparing the absolute value of a replica of a response from the proportional detecting means with the average value of the absolute value of the replica.

30. The apparatus of claim 29 wherein the comparing means includes means for effectively determining the amount of time the replica is above the signal proportional to the average value.

31. The apparatus of claim 13 wherein the means for deriving an indication of the quality of the received carrier includes means for detecting bit error rate.

32. The apparatus of claim 28 wherein the means for detecting bit error rate includes means responsive to a component in one of the channels for deriving a signal proportional to the in-phase energy in said one channel, and means for comparing the absolute value of a replica of a response from the proportional detecting means with a signal proportional to the average value of the absolute value of the replica.

* * * * *